United States Patent
Yamada et al.

(10) Patent No.: US 8,837,443 B2
(45) Date of Patent: Sep. 16, 2014

(54) REDUCING CONGESTION IN WIRELESS COMMUNICATION NETWORKS

(75) Inventors: Shohei Yamada, Camas, WA (US); Kenneth James Park, Cathlamet, WA (US)

(73) Assignee: Sharp Kabushiki Kaisha, Osaka (JP)

(*) Notice: Subject to any disclaimer, the term of this patent is extended or adjusted under 35 U.S.C. 154(b) by 439 days.

(21) Appl. No.: 12/856,536

(22) Filed: Aug. 13, 2010

(65) Prior Publication Data
US 2012/0039171 A1 Feb. 16, 2012

(51) Int. Cl.
*H04W 48/10* (2009.01)
*H04W 28/02* (2009.01)
*H04L 12/851* (2013.01)
*H04W 28/10* (2009.01)
*H04L 12/801* (2013.01)
*H04W 48/06* (2009.01)
*H04W 88/08* (2009.01)

(52) U.S. Cl.
CPC ............ *H04W 28/02* (2013.01); *H04L 47/24* (2013.01); *H04W 48/06* (2013.01); *H04W 88/08* (2013.01); *H04W 28/10* (2013.01); *H04L 47/12* (2013.01)
USPC .......................................... 370/338; 370/230

(58) Field of Classification Search
CPC ...... H04W 4/005; H04W 48/00; H04W 48/14
USPC ................... 370/229–234, 328–338, 468
See application file for complete search history.

(56) References Cited

U.S. PATENT DOCUMENTS

| | | |
|---|---|---|
| 2009/0181661 A1 | 7/2009 | Kitazoe et al. |
| 2009/0233634 A1 | 9/2009 | Aghili et al. |
| 2009/0239498 A1 | 9/2009 | Lee et al. |
| 2009/0253401 A1 | 10/2009 | Lee et al. |
| 2009/0291670 A1 | 11/2009 | Sennett et al. |
| 2010/0026472 A1 | 2/2010 | Kitazoe |
| 2010/0035575 A1 | 2/2010 | Wu |
| 2010/0075625 A1 | 3/2010 | Wu |
| 2010/0075627 A1 | 3/2010 | Roberts et al. |
| 2010/0120452 A1* | 5/2010 | Somasundaram et al. .... 455/458 |
| 2011/0201307 A1* | 8/2011 | Segura ........................ 455/411 |
| 2011/0274040 A1* | 11/2011 | Pani et al. ..................... 370/328 |

FOREIGN PATENT DOCUMENTS

| | | |
|---|---|---|
| EP | 2 107 770 | 3/2009 |
| EP | 2 154 915 | 6/2009 |
| EP | 2 166 786 | 7/2009 |
| EP | 2 166 784 | 8/2009 |
| JP | 2009-049543 | 3/2009 |
| WO | 2009/001288 | 12/2008 |
| WO | 2009/089498 | 7/2009 |

(Continued)

OTHER PUBLICATIONS

NTT DoCoMo, "Access Class Barring," 3GPP TSG RAN WG2 #59bis, R2-074000, Oct. 2007.

(Continued)

*Primary Examiner* — Pao Sinkantarakorn
(74) *Attorney, Agent, or Firm* — Keating & Bennett, LLP

(57) ABSTRACT

In a method for controlling network congestion, a parameter to bar access from specific user equipment is adjusted. The adjusted parameter in a specific system information block which is different from a System Information Block Type2 is transmitted. The method may be performed by a base station.

14 Claims, 12 Drawing Sheets

(56) References Cited

FOREIGN PATENT DOCUMENTS

| WO | 2009/116798 | 9/2009 |
|---|---|---|
| WO | 2009/155306 | 12/2009 |
| WO | 2010/032983 | 3/2010 |

OTHER PUBLICATIONS

International Search Report issued for International Patent Application No. PCT/JP2011/068498 on Sep. 27, 2011.
"Access control of MTC devices", 3GPP TSG RAN WG3 Meeting #68bis, Jan. 18-22, 2010, Valencia, Spain.
"Distribution for MTC uplink access in AS layer", 3GPP TSG-RAN WG2 #70, May 10-14, 2010, Montreal, Canada.
Written Opinion issued for International Patent Application No. PCT/JP2011/068498 on Sep. 11, 2012.
3GPP TS 36.300 V9.0.0, "Evolved Universal Terrestrial Radio Access (E-UTRA) and Evolved Universal Terrestrial Radio Access Network (E-UTRAN); Overall Description; Stage 2 (Release 9)," Jun. 2009.
3GPP TS 36.331 V9.1.0, "Evolved Universal Terrestrial Radio Access (E-UTRA) Radio Resource Control (RRC); Protocol specification (Release 9)," Dec. 2009.
3GPP TS 36.321 V9.1.0, "Evolved Universal Terrestrial Radio Access (E-UTRA) Medium Access Control (MAC) protocol specification (Release 9)," Dec. 2009.
3GPP TR 36.814 V1.5.0, "Further Advancements for E-UTRA Physical Layer Aspects (Release 9)," Mar. 2009.
3GPP TS 36.214 V8.6.0, "Evolved Universal Terrestrial Radio Access (E-UTRA) Physical layer—Measurements (Release 8)," Mar. 2009.
3GPP TS 36.213 V8.6.0, "Evolved Universal Terrestrial Radio Access (E-UTRA) Physical layer procedures (Release 8)," Mar. 2009.
3GPP TS 36.212 V9.0.0, "Evolved Universal Terrestrial Radio Access (E-UTRA); Multiplexing and Channel Coding (Release 9)," Dec. 2009.
3GPP TS 36.211 V9.0.0, "Evolved Universal Terrestrial Radio Access (E-UTRA); Physical Channels and Modulation (Release 9)," Dec. 2009.
3GPP TS 37.868 V0.3.0, "Study on RAN Improvements for Machine-type Communications (Release 10)," Apr. 2010.
3GPP TS 22.368 V10.0.0, "Service requirements for Machine-Type Communications (MTC); Stage 1 (Release 10)," Mar. 2010.
3GPP TS 23.888 V0.3.2, "System Improvements for Machine-Type Communications; (Release 10)," Mar. 2010.

* cited by examiner

REDUCING CONGESTION IN WIRELESS COMMUNICATION NETWORKS

TECHNICAL FIELD

The present invention relates generally to wireless communications and wireless communications-related technology. More specifically, the present invention relates to reducing congestion in wireless communication networks.

BACKGROUND

Wireless communication devices have become smaller and more powerful in order to meet consumer needs and to improve portability and convenience. Consumers have become dependent upon wireless communication devices and have come to expect reliable service, expanded areas of coverage, and increased functionality. A wireless communication system may provide communication for a number of cells, each of which may be serviced by a base station. A base station may be a fixed station that communicates with mobile stations.

As wireless communication devices have become more advanced, the potential uses of wireless communication devices have also increased. One such advancement is the introduction of machine-to-machine (M2M) devices. These devices may provide little or no human interface. Instead, these devices may provide a wireless link to a base station. The wireless link may be provided to an application that uses the wireless link to send information to and receive information from the base station.

Because these devices do not merely provide an interface for human interaction, many more of these devices may rely on a single base station. With an increase in the number of wireless devices communicating with a base station, there is potential for the base station to be overloaded. Benefits may be realized by preventing the base station from becoming overloaded.

DETAILED DESCRIPTION

Figure 1:
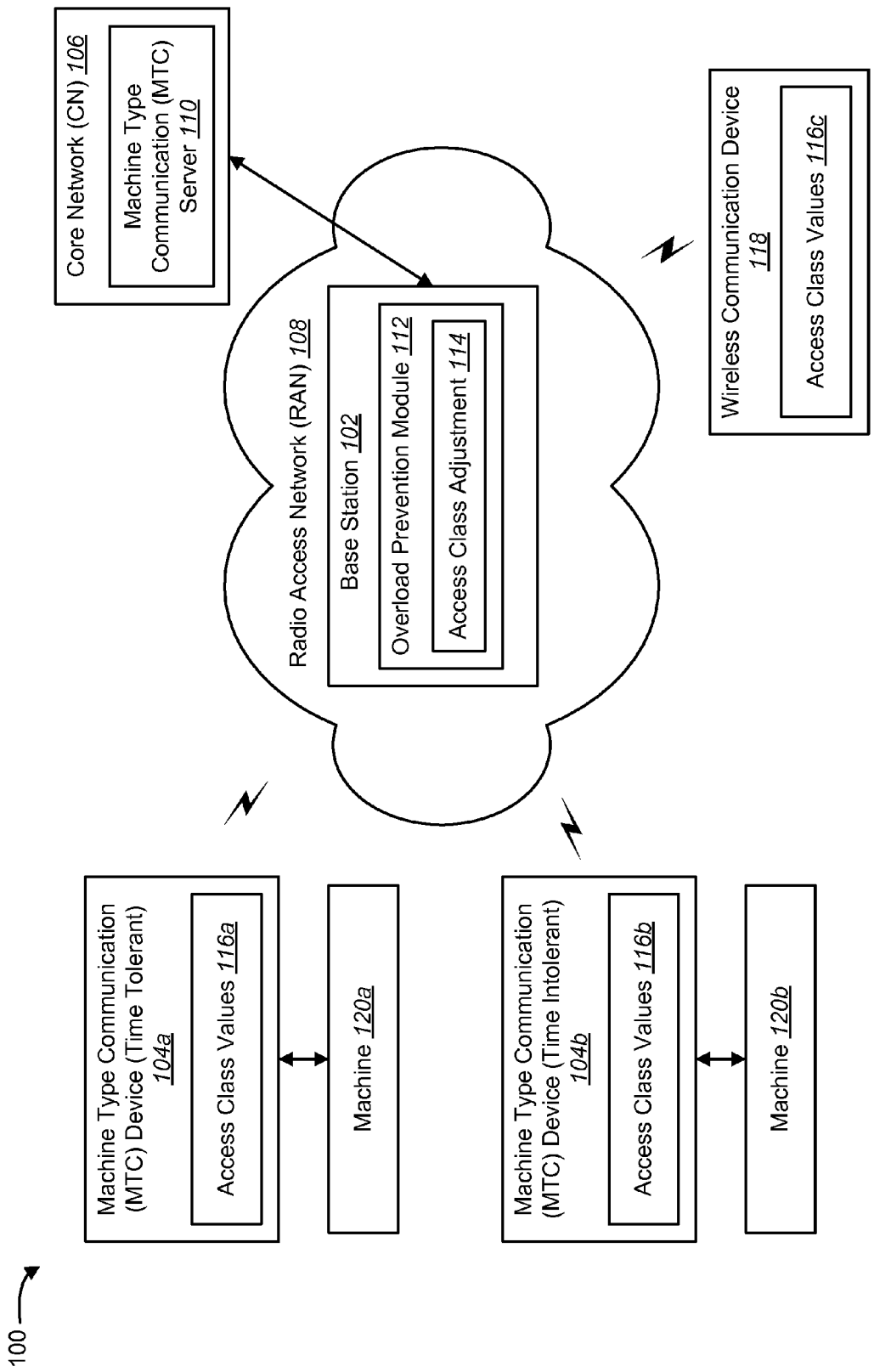
FIG. 1 is a block diagram illustrating a wireless communication system.

A method for controlling network congestion is described. A potential overload of the network is detected. An access class for which to change overload control information is selected. The overload control information for the selected access class is adjusted. The adjusted overload control information is transmitted.

The method may be performed by a base station. The selected access class may pertain to user equipments (UEs) that have the selected access class. The user equipments (UEs) may include machine type communication (MTC) devices and wireless communication devices. The overload control information for the selected access class may be adjusted in a system information message. Transmitting the adjusted overload control information may include broadcasting the system information message before a next modification period boundary.

A paging message with an overload control information change notification may be sent to the selected access class. The overload control information for the selected access class may be adjusted in a paging message. Transmitting the adjusted overload control information may include sending the paging message. The overload control information may include access class barring (ACB) information and initial back off (IBO) information.

An apparatus configured for controlling network congestion is also described. The apparatus includes a processor, memory in electronic communication with the processor and instructions stored in the memory. The instructions are executable by the processor to detect a potential overload of the network. The instructions are also executable by the processor to select an access class for which to change overload control information. The instructions are further executable by the processor to adjust the overload control information for the selected access class. The instructions are also executable by the processor to transmit the adjusted overload control information.

A method for controlling network congestion is described. The method is performed by a user equipment (UE). Up-to-date overload control information is obtained. Barring information is obtained from the up-to-date overload control information. The barring information is used to determine whether access to the network is barred.

The barring information may include access class barring information. The access class barring information may include an access class barring indicator. The user equipment (UE) may operate in idle mode. Using the barring information to determine whether access to the network is barred may include determining whether a bit in the access class barring indicator that corresponds to an access class of the UE is set to zero.

The bit in the access class barring indicator that corresponds to an access class of the UE may be set to zero. The user equipment (UE) may consider access to the network as not barred. An initial back off value may be obtained from the up-to-date overload control information. An initial back off based on the initial back off value may be applied.

The access class barring information may also include an access class barring factor. The bit in the access class barring indicator that corresponds to an access class of the UE may not be set to zero. A first random number may be drawn. The first random number may be compared to a value indicated by the access class barring factor.

The first random number may be lower than the value indicated by the access class barring factor. The user equipment (UE) may consider access to the network as not barred. An initial back off value may be obtained from the up-to-date overload control information. An initial back off based on the initial back off value may be applied.

The access barring information may also include an access class barring time. The first random number may not be lower than the value indicated by the access class barring factor. A second random number may be drawn. The user equipment (UE) may wait for a time period corresponding to the second random number and the access class barring time before retrying to access the network.

The initial back off may be applied to a radio resource control (RRC) layer prior to an RRC connection establishment. The initial back off may also be applied in the media access control (MAC) layer. The MAC layer may decide a time to wait before initiating a random access procedure. Applying an initial back off may include delaying for a time period corresponding to the initial back off value before attempting to attach to the network.

The barring information may include random access channel (RACH) barring information that includes an RACH barring factor and an RACH barring time. A first random number may be drawn. It may be determined that access to the network is barred by comparing the first random number to an RACH barring factor. Access to the network may be barred if the first random number is not lower than the RACH barring factor. A second random number may be drawn. The method may include delaying for a time period corresponding to the second random number and the RACH barring time before redrawing the first random number.

It may be determined that access to the network is not barred by comparing the first random number to the RACH barring factor. Access to the network may not be barred if the first random number is lower than the RACH barring factor. Random access procedures may then continue.

The UE may be a machine type communication (MTC) device or a wireless communication device. The UE may have an access class selected by a base station for which to change overload control information. The UE may be required to read the overload control information from a system information message prior to attempting to attach to the network. The UE may obtain the up-to-date overload control information by receiving a change notification via a paging message indicating a change in the overload control information in a system information message. The UE may also obtain the overload control information via a paging message.

An apparatus configured for controlling network congestion is also described. The apparatus includes a processor, memory in electronic communication with the processor and instructions stored in the memory. The instructions are executable to obtain up-to-date overload control information. The instructions are also executable to obtain barring information from the up-to-date overload control information. The instructions are further executable to use the barring information to determine whether access to the network is barred.

FIG. 1 is a block diagram illustrating a wireless communication system 100. The wireless communication system 100 may include a core network (CN) 106, a base station 102, a first machine type communication (MTC) device 104a communicating with a first machine 120a, a second machine type communication (MTC) device 104b communicating with a second machine 120b and a wireless communication device 118. A base station 102 may be in wireless communication with one or more machine type communication (MTC) devices 104 and one or more wireless communication devices 118.

A base station 102 may be referred to as an access point, a Node B, an eNodeB, or some other terminology. The term "base station" is used herein. The base station 102 and its coverage area may be referred to as a radio access network (RAN) 108. A wireless communication device 118 may be referred to as a mobile station, a subscriber station, an access terminal, a remote station, a user terminal, a terminal, a handset, a subscriber unit or some other terminology. The term "wireless communication device" is used herein.

A wireless communication device 118 may be a cellular phone, a smart phone, a laptop, a personal digital assistant (PDA), a wireless modem, etc. A wireless communication device 118 may transmit data to the base station 102 over a radio frequency (RF) communication channel. Likewise, the base station 102 may transmit data to the wireless communication device over a radio frequency (RF) communication channel.

A machine type communication (MTC) device 104 may communicate with zero, one or multiple base stations 102 over a radio frequency (RF) communication channel. In one configuration, the machine type communication (MTC) device 104 may communicate with the base station 102 on the downlink and/or uplink at any given moment. The downlink refers to the communication link from a base station 102 to a wireless device such as a wireless communication device 118 or a machine type communication (MTC) device 104. The uplink refers to the communication link from a wireless device such as a wireless communication device 118 or a machine type communication (MTC) device 104 to a base station 102. The communication link may be established using a single-input and single-output (SISO), multiple-input and single-output (MISO) or a multiple-input and multiple-output (MIMO) system. A MIMO system may include both a transmitter and a receiver equipped with multiple transmit and receive antennas.

The Third Generation Partnership Project (3GPP) is a collaboration between groups of telecommunications associations to make globally applicable mobile phone system specifications. Long Term Evolution (LTE) is the project name of a high performance air interface for cellular mobile telephony. Long Term Evolution Advanced (LTE-A) is a mobile communication standard that works as an enhancement to the LTE air interface. In 3GPP LTE-A Release 10, specifications include functionality that enables the use of machine type communication (MTC) devices 104.

A machine type communication (MTC) device 104 is similar to a wireless communication device 118, except the primary function does not provide a user interface. A machine type communication (MTC) device 104 may use the physical (PHY) layer, medium access control (MAC) layer, radio link control (RLC) layer, the Packet Data Convergence Protocol (PDCP) and the Radio Resource Control (RRC) layer to establish a communication link with a base station 102 and the core network (CN) 106. However, a machine type communication (MTC) device 104 may not provide a human interface. Instead, a machine type communication (MTC) device 104 may operate as a network access point between machines 120 (i.e., between data acquisition/data aggregation devices and a machine type communication (MTC) server 110).

A machine type communication (MTC) server 110 may be a device that uses the core network (CN) 106 to facilitate a connection with a machine type communication (MTC) application on a machine type communication (MTC) device 104. Examples of machine type communication (MTC) devices 104 include surveillance equipment, utility measurement devices, fleet management devices and production chain monitoring devices. Machine type communication (MTC) devices 104 and wireless communication devices 118 may be collectively referred to as user equipment (UE). Thus, a machine type communication (MTC) device 104 is a specific type of user equipment (UE).

A machine type communication (MTC) device 104 may be categorized according to the requirements of the machine type communication (MTC) device 104. The first machine type communication (MTC) device 104a may be categorized as time tolerant because it is not necessary for the first machine type communication (MTC) device 104a to immediately report its data to the machine type communication (MTC) server 110. The second machine type communication (MTC) device 104b may be categorized as time intolerant because it is highly desirable to immediately report the data collected by the second machine type communication (MTC) device 104b to the machine type communication (MTC) server 110.

A machine type communication (MTC) device 104 may be identified as a specific user equipment (UE) (i.e., a user equipment (UE) that has a specific access class). Time tolerant machine type communication (MTC) devices 104a and time intolerant machine type communication (MTC) devices 104b may each be identified as specific user equipment (UE).

The method by which the network partitions security, health and emergency class user equipment (UE) from consumer class user equipment (UE) is via an access class hierarchy. Each machine type communication (MTC) device 104 and each wireless communication device 118 may be preconfigured with one or more access class values 116a-c (i.e., a value from 1 to n). Before a user equipment (UE) can access the system, the user equipment (UE) must verify whether an access class value 116 on the user equipment (UE) is barred from access to the cell. In this way, the base station 102 may control the access of user equipment (UE) to the cell.

A base station 102 may be configured to establish communication links with multiple wireless communication devices 118 and/or multiple machine type communication (MTC) devices 104. Because of the limited communication requirements for machine type communication (MTC) devices 104, many more machine type communication (MTC) devices 104 may be influenced by a base station 102 than wireless communication devices 118 influenced by the base station 102. It is predicted that ten times as many machine type communication (MTC) devices 104 as wireless communication devices 118 may be under the influence of a base station 102.

An increase in the number of user equipment (UE) communicating with a base station 102 increases the possibility for congestion. The base station 102 may attempt to mitigate the congestion using an overload prevention module 112. The overload prevention module 112 may limit network access for certain access class values 116. For example, the overload prevention module 112 may determine an access class 114 for adjustment. The access class 114 may correspond to a group of user equipment (UE) that have the potential to cause congestion for the base station 102 and/or have the potential to reduce congestion via network access adjustments. The base station 102 may then adjust network access parameters for the specific access class 114 to reduce congestion.

Figure 2:
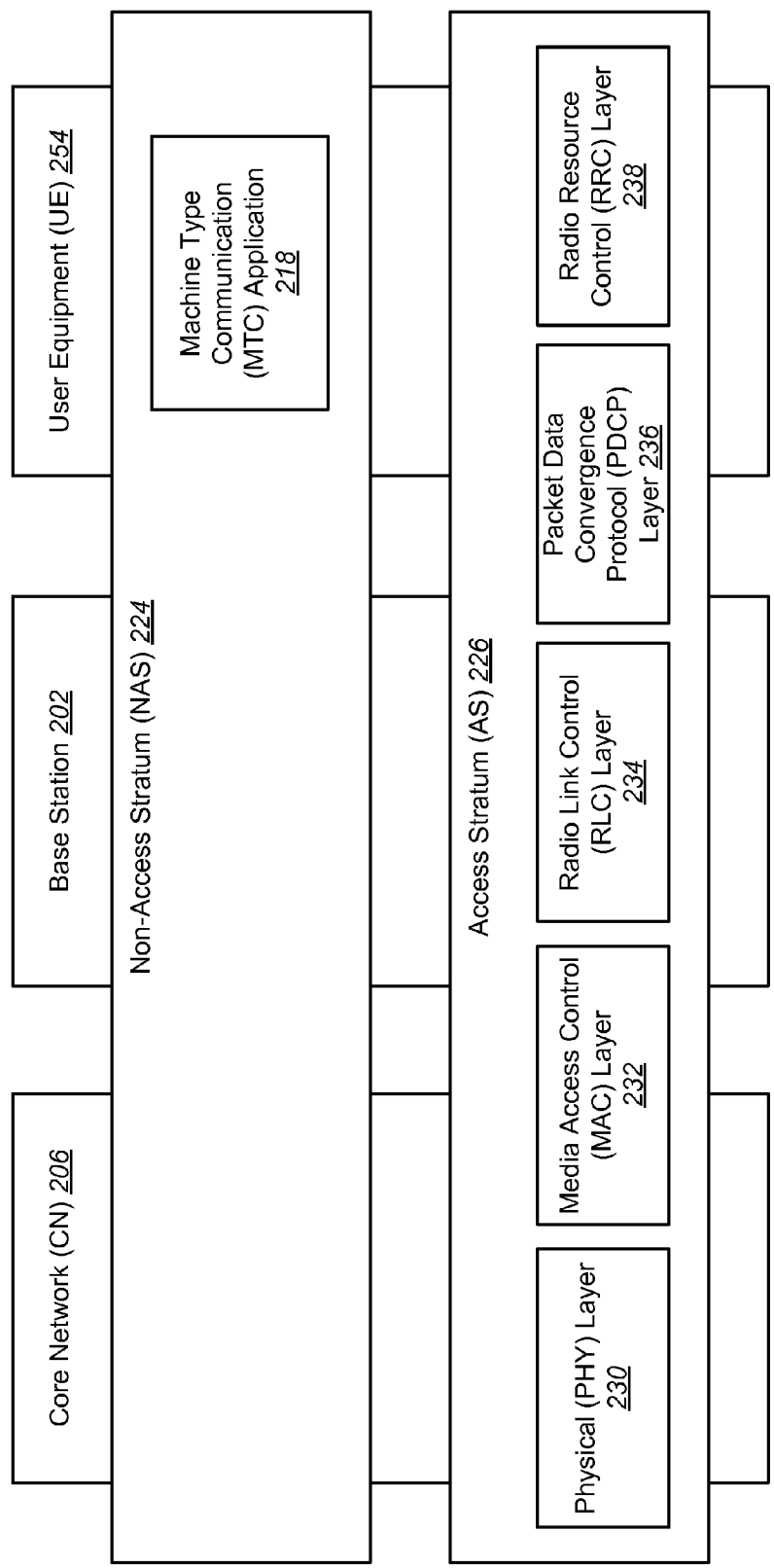
FIG. 2 is a block diagram illustrating an Open System Interconnection (OSI) model.

FIG. 2 is a block diagram illustrating an Open System Interconnection (OSI) model. This model is a way of subdividing a system in smaller parts (called layers) from the point of view of communications. A layer is a collection of conceptually similar functions that provides services to the layer above it and receives services from the layer below it. Each layer may provide services to the layer above and request services from the layer below. The Open System Interconnection (OSI) model may facilitate communications between a core network (CN) 206, a base station 202 user equipment (UE) 254. The base station 202 of FIG. 2 may be one configuration of the base station 102 of FIG. 1. The user equipment (UE) 254 of FIG. 2 may be one configuration of the machine type communication (MTC) devices 104 or the wireless communication device 118 of FIG. 1. The core network (CN) 206 of FIG. 2 may be one configuration of the core network (CN) 106 of FIG. 1.

In the Open System Interconnection (OSI) model, the layers may be divided into two groups: an access stratum (AS) 226 and a non-access stratum (NAS) 224. Access stratum (AS) 226 and non-access stratum (NAS) 224 are 3GPP terms. The access stratum (AS) 226 includes the layers of the Open System Interconnection (OSI) model used to setup, maintain and terminate an LTE data connection between a user equipment (UE) 254 and a base station 202. In the 3GPP LTE and LTE-A specifications, the physical (PHY) layer 230, media access control (MAC) layer 232, radio link control (RLC) layer 234, packet data convergence protocol (PDCP) layer 236 and the radio resource control (RRC) layer 238 are all part of the access stratum (AS) 226. An LTE system may use the radio resource control (RRC) layer 238 to handle the transport of dedicated information between a user equipment (UE) 254 and a base station 202 control plane.

The non-access stratum (NAS) 224 includes those layers used to service machine type communication (MTC) applications 218 on the user equipment (UE) 254 (if the user equipment (UE) 254 is a machine type communication (MTC) device 104). In the LTE system, the Evolved Packet System (EPS) Mobility Management (EMM) protocol provides procedures for the control of mobility when wireless devices (such as a wireless communication device 118 or a machine type communication (MTC) device 104) are using the Evolved UMTS (Universal Mobile Telecommunications System) Terrestrial Radio Access Network (E-UTRAN). The EMM protocol also provides control of security for the non-access stratum (NAS). The procedures are used by the protocols for mobility management and session management between a wireless device and a Mobility Management Entity (MME) in the Evolved Packet System (EPS). These protocols belong to the non-access stratum (NAS) 224. An application layer is a layer that is supported by the non-access stratum (NAS) 224. The access stratum (AS) 226 provides radio access network (RAN) 108 resource to the non-access stratum (NAS) 224. Applications 218 that are running on a machine type communication (MTC) device 104 are considered part of the non-access stratum (NAS) 224.

As discussed above, 3GPP LTE-A Release 10 specifications include functionality that enables the use of machine type communication (MTC) devices 104. A machine type communication (MTC) device 104 is similar to a wireless communication device 118 in that it uses the access stratum (AS) 226 layers to establish a communication link with the base station 202. But a machine type communication (MTC) device 104 differs from a wireless communication device 118 because the machine type communication (MTC) device 104 does not provide the standard human interface of a typical handset. Instead, the purpose of a machine type communication (MTC) device 104 is to operate as a radio access network (RAN) 108 access point between machines 120 (i.e., between data acquisition/data aggregation devices and the machine type communication (MTC) server 110). The machine type communication (MTC) device 104 may still use the non-access stratum (NAS) 224 to support the applications 218 that run on the machine type communication (MTC) device 104 and require network resources.

Figure 3:
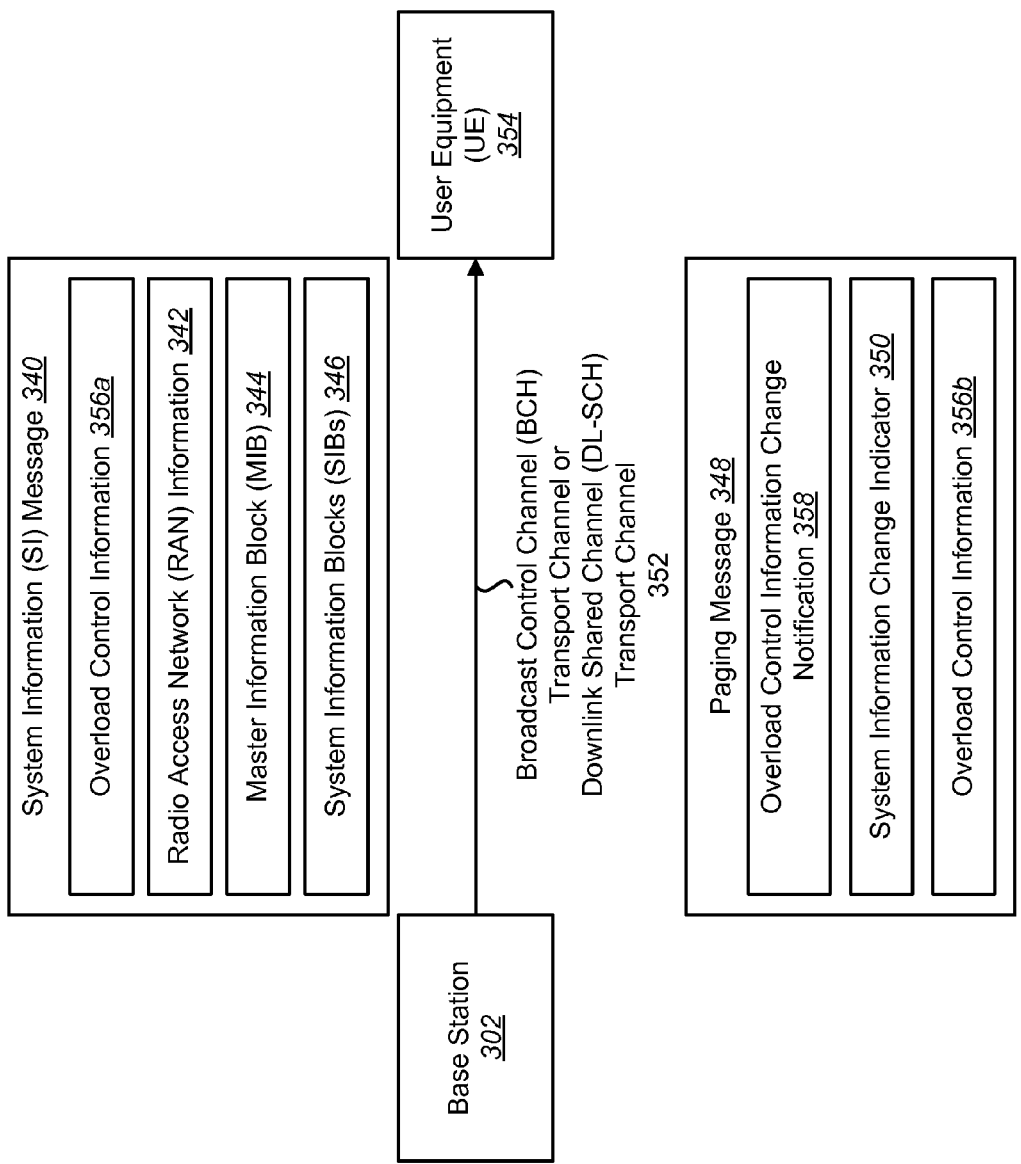
FIG. 3 is a block diagram illustrating the transmission of a System Information (SI) message and a paging message from a base station to a user equipment (UE)

FIG. 3 is a block diagram illustrating the transmission of a System Information (SI) message 340 and a paging message 348 from a base station 302 to a user equipment (UE 354). The base station 302 of FIG. 3 may be one configuration of the base station 102 of FIG. 1. The user equipment (UE) 354 of FIG. 3 may be one configuration of the user equipment (UE) 254 of FIG. 2. The base station 302 may broadcast a downlink radio frame that includes the system information message 340. The wireless resources 352 used to send messages from the base station 302 to the user equipment (UE) 354 may be broadcast resources (i.e., using the broadcast control channel (BCH) transport channel) or dedicated resources (i.e., using the downlink shared channel (DL-SCH) transport channel).

In LTE-A, the base station 302 broadcasts information necessary for a user equipment (UE) 354 (such as a wireless communication device 118 or a machine type communication (MTC) device 104) to establish a communication link with the network via System Information (SI) messages 340. System information is divided into the master information block (MIB) 344 and a number of system information blocks (e.g., SIB1 ... SIB12) 346. A first system information block 346 may be referred to as SystemInformationBlockType1 (SIB1) and may include scheduling information in SchedulingInfoList that indicates where emergency information such as Earthquake and Tsunami Warning System (ETWS)/Commercial Mobile Alert System (CMAS) data SIB messages are located and a system information change indicator systemInfoValueTag that indicates a change in the System Information (SI) message 340 has occurred. A second system information block 346 may be referred to as SystemInformationBlockType2 (SIB2) and may include a hierarchical partitioning of wireless communication devices 118 and machine type communication (MTC) devices 104 in ac-BarringInfo.

Another system information block may be referred to as SystemInformationBlockType10/11 (SIB10 and SIB11) and may include the Earthquake and Tsunami Warning System (ETWS) message data. Yet another system information block may be referred to as SystemInformationBlockType12 and may include the Commercial Mobile Alert System (CMAS) message data. SystemInformationBLockType10/11 and SystemInformationBlockType12 may each include emergency information 330. The system information (SI) message 340 may also include radio access network (RAN) information 342.

A base station 302 may broadcast a paging message 348 to inform user equipments (UEs) 354 of a system information change. A paging message 348 may be broadcast occasionally user equipment's (UE) 354 paging occasion. The paging occasion may be determined by the International Mobile Subscriber Identity (IMSI) of a user equipment (UE) 354 and system configuration settings.

The paging message 348 may include a system information change indicator 350. The system information change indicator 350 may be the data field systemInfoModification, which when set indicates that System Information (SI) data is scheduled to change at the next Modification Period boundary. A Modification Period boundary limits when changes to the System Information (SI) data are allowed. Change of the System Information (SI) data only occurs at specific radio frames. The System Information (SI) data may be transmitted a number of times with the same content within a modification period, as defined by its scheduling. When systemInfoModification is set during "modification period N" then the change will not occur until "modification period N+1." The paging message may also include an etws-cmas-lndication, which, when set indicates that Earthquake and Tsunami Warning System (ETWS)/Commercial Mobile Alert System (CMAS) data is being broadcast.

To mitigate congestion when a large number of user equipments (UEs) 354 are attempting to attach to the network at nearly the same time, the base station 302 may quickly change overload control information 356 for some or all of the user equipments (UEs) 354. In one configuration, the base station 302 may only change overload information 356 for all of the user equipments (UEs) 354 that have the specific access class 114. Changes in overload control information 356 may reduce the congestion of a base station 302 by forcing some of the user equipments (UEs) 354 attempting to attach to the network to delay before reattempting access to the network. Overload control information 356 is discussed in additional detail below in relation to FIG. 4.

To mitigate congestion, a base station 302 may be required to quickly change overload control information 356 for a specific access class 114 before the next modification period. This is because the precise overload control may be needed for a specific situation (e.g., introducing machine type communication (MTC) devices 104). In Rel-8, the system information (SI) message 340 may be transmitted a number of times with the same content within a modification period, as defined by its scheduling.

The modification period boundaries are defined by system frame number (SFN) for which SFN mod m=0, where m is the number of radio frames in the modification period. The modification period is configured by the system information (SI) message 340.

When the network changes some or all of the system information (SI) in a system information (SI) message 340, the base station 302 first notifies the user equipments (UEs) 354 about this change. This may be done throughout a modification period. In the next modification period, the network may transmit the updated system information (SI). Upon receiving the system information change indicator 350 in a paging message 348, the user equipment (UE) 354 may acquire the new system information (SI) via the system information (SI) message 340 from the start of the next modification period. The paging message 348 is used to inform user equipments (UEs) 354 in RRC_IDLE and user equipments (UEs) in RRC_CONNECTED about a system information change.

However, a base station 302 may need to change system information (SI) prior to the next modification period to prevent congestion. Specifically, the base station 302 may need to update overload control information 356 prior to the next modification period. In one configuration, the base station 302 may update the overload control information 356a in the system information (SI) message 340 during a modification period.

The base station 302 may include an overload control information change notification 358 in the paging message 348 when a change is made to the overload control information 356a in the system information (SI) message 340. The overload control information change notification 358 may indicate a change in overload control information 356a for those user equipments (UEs) 354 that have the specific access class 114. If those user equipments (UEs) 354 receive the paging message 348 including the overload control information change notification 358, the user equipments (UEs) 354 may start receiving the updated overload control information 356a. In this way, only the user equipments (UEs) 354 that have the specific access class 114 may search for the updated overload control information 356a while user equipments (UEs) 354 with unrelated access classes are not influenced by the change to system information and the overload control information change notification 358.

In another configuration, the base station 302 may include the updated overload control information 356b in the paging message 348. The updated overload control information 356b may be directed to a specific access class 114 so that only the user equipments (UEs) 354 that have the specific access class 114 read the updated overload control information 356b.

In yet another configuration, to reduce the load of a paging message 348, a change in System Information (SI) without a paging notification can be performed. User equipments (UEs) 534 that have the specific access class 114 may be always required to monitor and acquire overload control information 356a for the specific access class 114 when accessing the cell. User equipments (UEs) 354 that do not have the specific access class 114 (these user equipments (UEs) 354 may be referred to as normal user equipments (UEs) 354), may not be required to acquire system information (SI) when accessing the cell. In other words, a user equipment (UE) 354 acquires specific system information (SI) including overload control information 356 during a radio resource control (RRC) connection establishment if either a) the user equipment (UE) 354 is required to do so or b) the user equipment (UE) 354 has the specific access class 114. Otherwise, the user equipment (UE) 354 does not acquire system information (SI) during the radio resource control (RRC) connection establishment.

Figure 4:
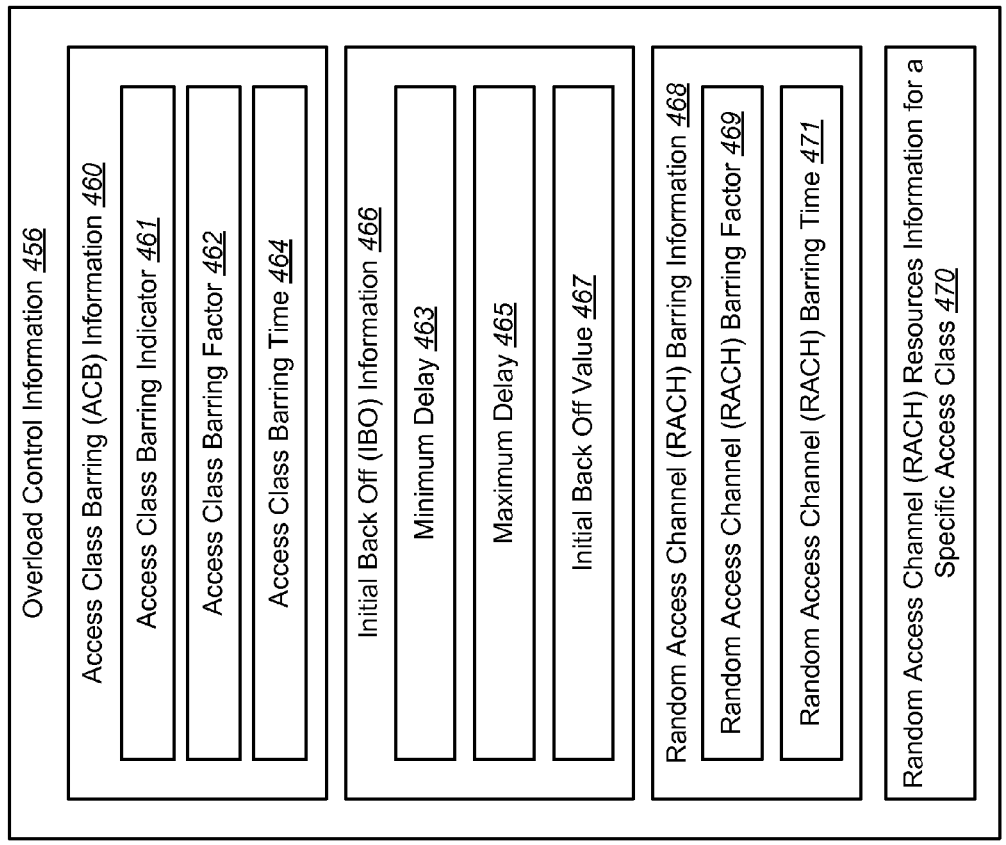
FIG. 4 is a block diagram illustrating various components of overload control information.

FIG. 4 is a block diagram illustrating various components of overload control information 456. The overload control information 456 of FIG. 4 may be one configuration of the overload control information 356 of FIG. 3. The overload control information 456 may be transmitted from a base station 302 to a user equipment (UE) 354. As discussed above in relation to FIG. 3, the overload control information 456 may be sent to a user equipment (UE) 354 in a system information (SI) message 340 or in a paging message 348.

To mitigate congestion when a large number of user equipments (UEs) 354 are attempting to attach to the network at nearly the same time, a base station 302 may use Access Class Barring (ACB) and Back Off (BO). The Access Class Barring (ACB) mechanism controls access to the network by a user equipment (UE) 354. If the Access Class Barring (ACB) mechanism does not allow a user equipment (UE) 354 access to the network, the user equipment (UE) 354 may be prevented from another access attempt for some configurable period of time. After the configurable period of time, the user equipment (UE) 354 may again use the Access Class Barring (ACB) mechanism to request access to the network. The Access Class Barring (ACB) mechanism has the capability to prevent a user equipment (UE) 354 from ever gaining access to the network. Thus, the Access Class Barring (ACB) mechanism may reduce the number of accesses to the network.

In the Rel-8/9 specification, Access Class Barring (ACB) information may be provided by SIB2. However, SIB2 has a very limited payload capacity. Thus, Access Class Barring (ACB) information and initial back off information may be added to other system information blocks (SIBS) besides SIB2. In one configuration, a new system information block SIBx may be used.

Access Class Barring (ACB) may use access class barring information 460. In the Rel-8/9 specification, access class barring information 460 may be provided by SIB2. The access class barring information 460 may apply to each access class or to a group of access classes. Access Class Barring (ACB) may be applied to the specific user equipments (UEs) 354 only (i.e., those user equipments (UEs) 354 that have the specific access class 114). SIB2 has a very limited payload capacity. Thus, access class barring information 460 and initial back off (IBO) information 466 may be added to other system information blocks (SIBs) besides SIB2. In one configuration, a new system information block SIBx may be used.

The access class barring information 460 may include an access class barring indicator 461 ac-BarringForSpecialAC, an access class barring factor 462 ac-BarringFactor and an access class barring time 464 ac-BarringTime. In the Rel-8/9 specification, the access class barring factor 462 and the access class barring time 464 are the same among all access classes. However, with the introduction of machine type communication (MTC) devices 104, the characteristics for each access class may differ significantly. It is therefore needed to provide the access class barring factor 462 and the access class barring time 464 for a specific access class. A user equipment (UE) 354 may select the access class barring factor 462 and the access class barring time 464 based on its own access class.

The access class barring indicator 461 ac-BarringForSpecialAC is a bit strings as a bitmap for each access class, which represent whether access to the cell is barred for each access class. The access class barring factor 462 may represent the possibility that a user equipment (UE) 354 can obtain access rights to the network. A user equipment (UE) 354 may ensure its own access class and the access class barring (ACB) information 460 for its access class. The user equipment (UE) 354 may draw a random number "rand" uniformly distributed in the range 0<=rand<1 and if rand is lower than the value indicated by the access class barring factor 462, the user equipment (UE) 354 considers access to the cell as not barred. If rand is not lower than the value indicated by the access class barring factor 462, the user equipment (UE) 354 considers access to the cell as barred. The user equipment (UE) 354 may then use a random number along with the access class barring time 464 to determine the amount of time to wait before the next access attempt.

Although an Access Class Barring (ACB) mechanism can effectively mitigate congestion, such a mechanism also causes a latency problem if the user equipment (UE) 354 is not using the most up-to-date access class barring information 460. If the event that Access Class Barring (ACB) mechanism allows a user equipment (UE) 354 access to the network is triggered, with the introduction of machine type communication (MTC) devices 104, a significant number of machine type communication (MTC) devices 104 may respond to the same trigger event at the same time and attempt to attach to the network. Especially, this may occur when the overload control information 356 has changed to allow access to the cell, which may cause a sudden increase in congestion.

A back off mechanism may be used to mitigate the congestion to some extent by delaying a user equipment (UE) 354 access attempt with the hope that there will be less congestion in the future. However, a back off mechanism cannot alter the fundamental problem of too many user equipments (UEs) 354 attempting to attach to the network. The media access control (MAC) layer 232 may provide a back off parameter for reattempt of the random access channel (RACH) process. An initial back off (IBO) mechanism may be used for the first attempt of the random access channel (RACH) process.

The overload control information 456 may include initial back off (IBO) information 466. The initial back off (IBO) information 466 may include an initial back off value 467. The initial back off value 467 may be static (i.e., the initial back off value 467 was provisioned into the user equipment (UE) 354 at the time of manufacture). The initial back off value 467 may also be dynamic (i.e., the initial back off value 467 is signaled to the user equipment (UE) 354 via a dedicated channel (i.e., a radio resource control (RRC) message)). If the initial back off value 467 is dynamic, the initial back off value 467 may be unique to the user equipment (UE) 354. The initial back off value 467 may also be signaled via a broadcast channel (i.e., system information block (SIB) data); in this case the initial back off value 467 is the same for all user equipments (UEs) 354. The initial back off value 467 may further be signaled via the paging channel (i.e., via a paging message 348); in this case the initial back off value 467 is the same for one group of user equipments (UEs) 354 but different from that of another group of user equipments (UEs) 354.

The initial back off (IBO) information 466 may be used by the user equipment (UE) 354 after the Access Class Barring (ACB) mechanism has determined that the user equipment (UE) 354 is allowed access to the network. Specific user equipments (UEs) 354 may be required to delay for a back off time after determining that access to the cell is not barred before initiating a message transmission with the cell. The initial back off (IBO) information 466 is discussed in further detail below in relation to FIG. 9.

The initial back off value 467 signaled to the user equipment (UE) 354 may be a representation of the current load experienced by the network. For example, if the current load is low, then the initial back off value 467 may indicate that the user equipment (UE) 354 can use the next opportunity to attempt to access the network. If the current load is high, then the initial back off value 467 may indicate that the user equipment (UE) 354 must wait for some time before physical random access channel (PRACH) resources can be used.

The initial back off value 467 can be controlled and configured by the base station 102 because the base station 102 has knowledge of the current network congestion. Also, the base station 102 knows that congestion will occur after providing system information block (SIB) 346 data that includes overload control information 456. Thus, the initial back off value 467 may be a representation of the current load on the base station 102.

The initial back off (IBO) information 466 may represent the minimum delay 463 and/or the maximum delay 465 for the distribution (i.e., the minimum back off value and/or the maximum back off value). A user equipment (UE) 354 may select a random number between the minimum back off value and the maximum back off value that indicates the amount of delay the user equipment (UE) 354 must wait before initiating a message transmission. The minimum back off value may be fixed at 0. The initial back off parameter may be set in SIB2 as part of the Access Class Barring (ACB) information 460 or it can be sent via another system information block (SIB) 346.

The overload control information 456 may also include random access channel (RACH) barring information 468. The current access class barring (ACB) mechanism can only be applied to user equipments (UEs) 354 in RRC_IDLE. If many user equipments (UEs) 354 are in RRC_CONNECTED in the cell, the base station 102 may want to control these user equipments (UEs) 354 to mitigate random access attempts initiated by the media access control (MAC) layer 232 of each user equipment (UE) 354.

The random access channel (RACH) barring information 468 may include a random access channel (RACH) barring factor 469 and a random access channel (RACH) barring time 471. Both the random access channel (RACH) barring factor 469 and the random access channel (RACH) barring time 471 may be provided to user equipments (UEs) 354 that have the specific access class 114. The media access control (MAC) layer 232 in each user equipment (UE) 354 may draw a random number "rand" uniformly distributed in the range 0<=rand<1. If "rand" is lower than the value of the random access channel (RACH) barring factor 469, the media access control (MAC) layer 232 considers an initiation of random access procedure as not barred. Otherwise, the media access control (MAC) layer 232 considers the initiation of random access procedure as barred.

If the initiation of random access procedure is barred, the user equipment (UE) 354 may draw a random number and decide the time to wait according to the random access channel (RACH) barring time 471 before reattempting the random access procedure. The random access channel (RACH) barring information 468 may be signaled to the user equipment (UE) 354 via a dedicated channel, a broadcast channel, a media access control (MAC) Control Element or the paging channel. The random access channel (RACH) barring mechanism can mitigate random access channel (RACH) attempts initiated by the media access control (MAC) layer 232 in each user equipment (UE) 354. The use of the random access channel (RACH) barring mechanism may reduce random access channel (RACH) congestion by user equipments (UEs) 354 in RRC_IDLE and user equipments (UEs) in RRC_CONNECTED. Because the media access control (MAC) layer 232 does not know whether the user equipment (UE) 354 is in RRC_IDLE or RRC_CONNECTED, random access channel (RACH) barring influences both states.

The overload control information may also include random access channel (RACH) resources information 470 for a specific access class. Specific random access channel (RACH) resources may be pertained to specific user equipments (UEs) 354.

Figure 5:
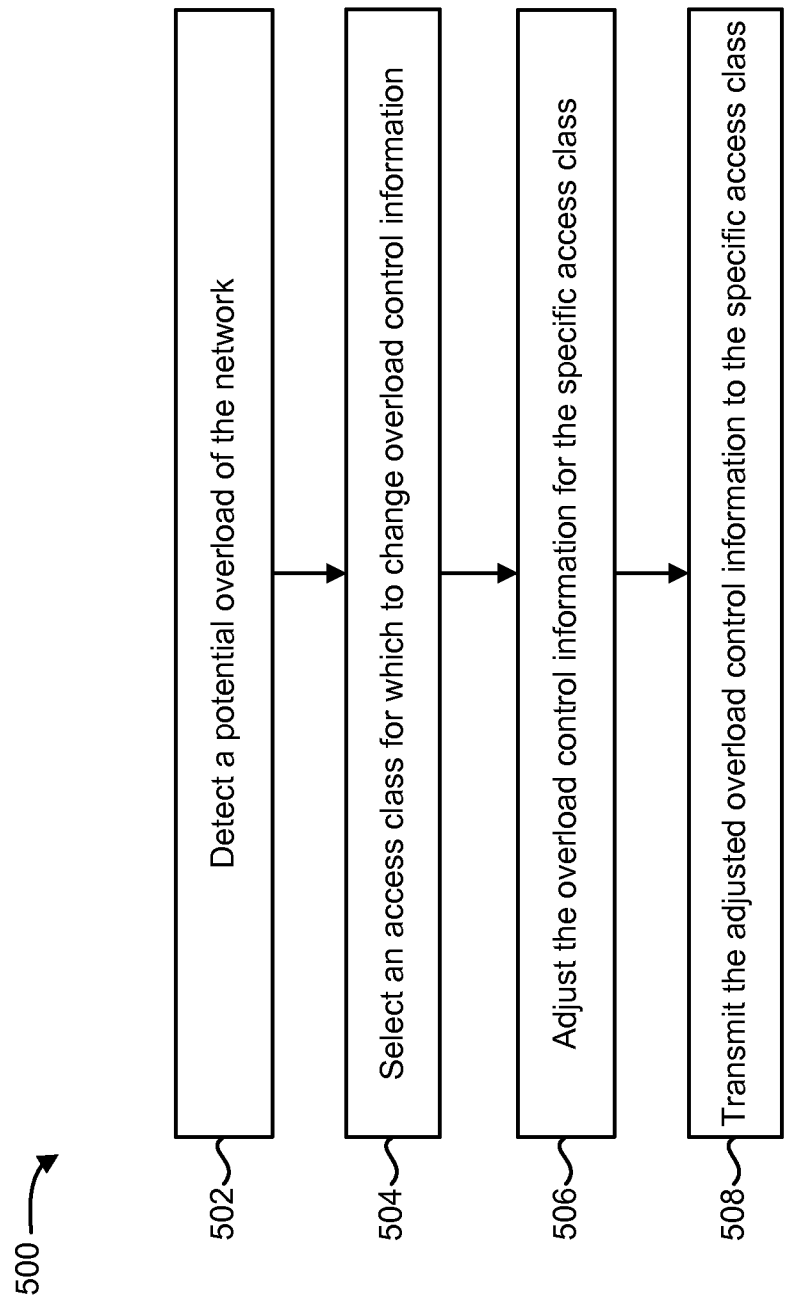
FIG. 5 is a flow diagram of a method for reducing congestion.

FIG. 5 is a flow diagram of a method 500 for reducing congestion. The method 500 may be performed by a base station 102. The base station 102 may detect 502 a potential overload of the network. For example, the base station 102 may detect a large number of user equipments (UE) 302 that can potentially overwhelm the physical random access channel (PRACH) resources of the base station 102.

The base station 102 may select 504 an access class 114 for which to change overload control information 356. The specific access class 114 may be selected such that changes in the overload control information 356 will mitigate the congestion. For example, the specific access class 114 may include a large group of machine type communication (MTC) devices 104 that respond to the same trigger and could potentially cause congestion. Multiple access classes 114 may also be selected.

Once the base station 102 has selected 504 an access class 114, the base station 102 may adjust 506 the overload control information 356 for the specific access class 114. Adjusting 506 the overload control information 356 may include changing the access class barring indicator 461, changing the access class barring factor 462, changing the access class barring time 464, changing the minimum delay 463 in the initial back off (IBO) information 466 or changing the maximum delay 465 in the initial back off (IBO) information 466. The base station 102 may then transmit 508 the adjusted overload control information 356 to the specific access class 114.

Figure 6:
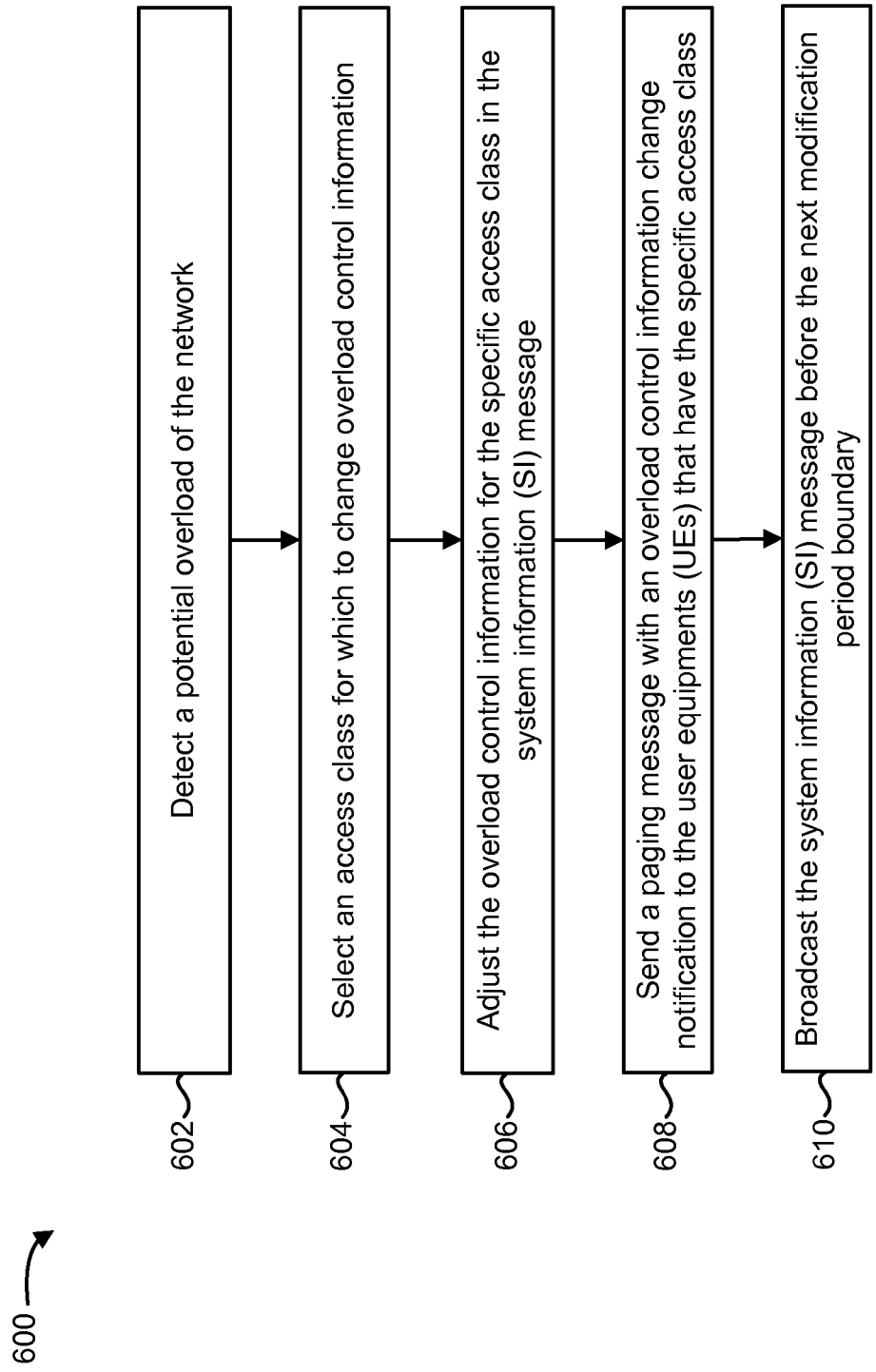
FIG. 6 is a flow diagram of a method for reducing congestion using notification sent via a paging message.

FIG. 6 is a flow diagram of a method 600 for reducing congestion using notification sent via a paging message 348. The method 600 may be performed by a base station 102. The base station 102 may detect 602 a potential overload of the network. The base station 102 may then select 604 an access class 114 for which to change overload control information 356. As discussed above, the base station 102 may select 604 the access class 114 such that changes to the overload control information 356 settings corresponding to the access class 114 will mitigate the potential overload of the network.

The base station 102 may then adjust 606 the overload control information 356a for the specific access class 114 in the system information (SI) message 340. The system information (SI) message 340 may be transmitted a number of times with the same content within a modification period by the base station 102. However, a user equipment (UE) 354 that have the specific access class 114 may not check the system information (SI) message 340 during a modification period for the latest overload control information 356a. To account for this, the base station 102 may send 608 a paging message 348 with an overload control information change notification 358 to the user equipments (UEs) 354 that have the specific access class 114.

In one configuration, the paging message 348 may be sent to all user equipments (UEs) 354 but may indicate that the paging message 348 is only relevant for those user equipments (UEs) 354 that have the specific access class 114. The base station 102 may then broadcast 610 the system information (SI) message 340 before the next modification period boundary. In this way, the base station 102 may mitigate congestion by changing the overload control information 356a used by the user equipments (UEs) 354 that have the specific access class 114.

Figure 7:
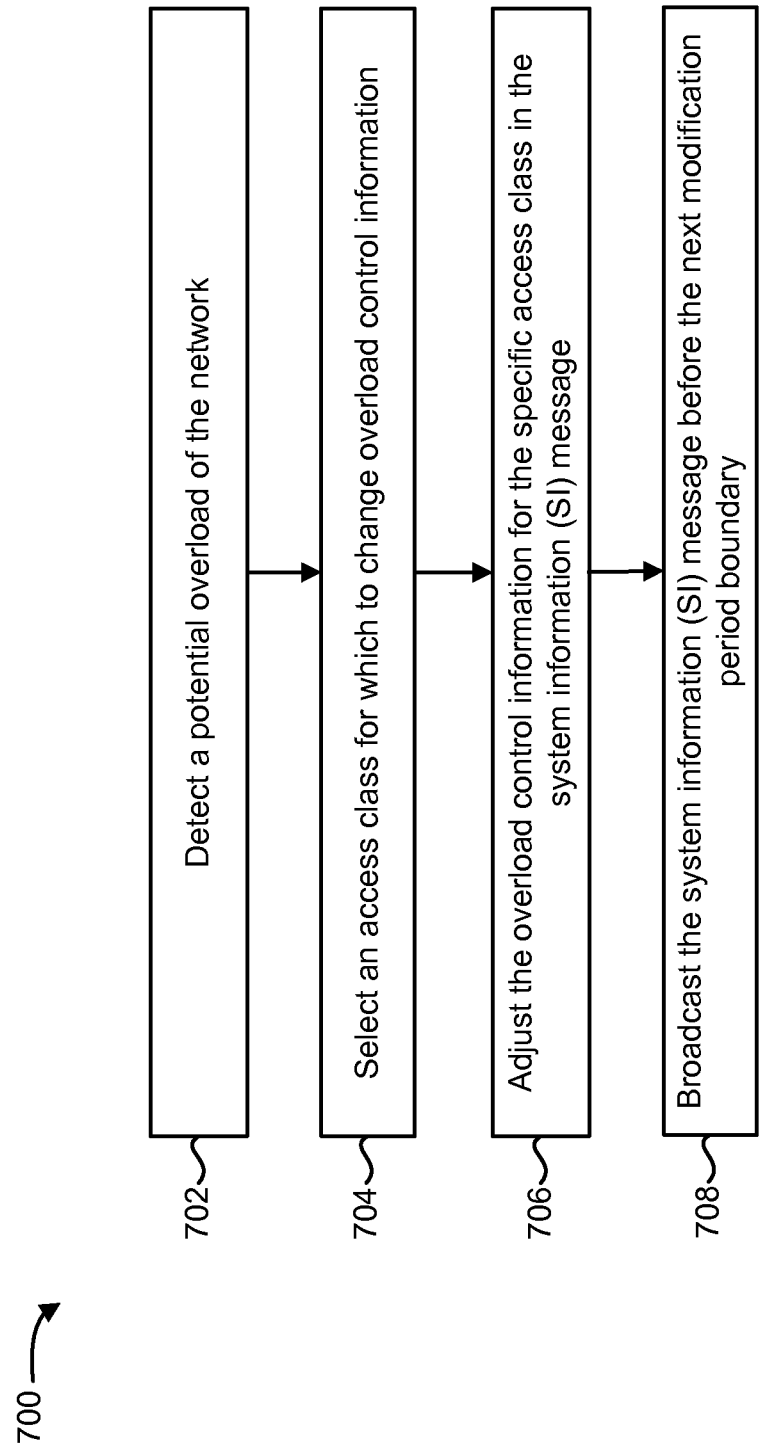
FIG. 7 is a flow diagram of a method for reducing congestion without a paging message.

FIG. 7 is a flow diagram of a method 700 for reducing congestion without a paging message 348. The method 700 may be performed by a base station 102. The base station 102 may detect 702 a potential overload of the network. The base station 102 may then select 704 an access class 114 for which to change overload control information 356a. The base station 102 may select 704 the access class 114 such that changes to the overload control information 356a settings corresponding to the access class 114 will mitigate the potential overload of the network.

The base station 102 may then adjust 606 the overload control information 356a for the specific access class 114 in the system information (SI) message 340. In one configuration, the user equipments (UEs) 354 with a specific access class 114 may be required to always monitor overload control information 356a in the system information (SI) message 340 prior to attempting to access the cell.

A user equipment (UE) 354 in IDLE_MODE that attempts to access the cell (i.e., start a random access procedure) may first attempt to receive the overload control information 356a in the system information (SI) message 340. This can ensure that the overload control information 356a is up-to-date in the user equipment (UE) 354. However, this may cause some delays in the establishment of a radio resource control (RRC) connection or in the random access channel (RACH) process. Therefore, only specific user equipments (UEs) 354 (i.e., those user equipments (UEs) 354 that have the specific access class 114 or those user equipments (UEs) 354 that are specifically required to do so) may be required to read all necessary system information block (SIB) 346 data including overload control information 356a before accessing the cell.

For example, a machine type communication (MTC) device 104a that is time tolerant may be required to read the necessary system information block (SIB) 346 data including the overload control information 356a before the machine type communication (MTC) device 104a can access the cell. But, a machine type communication (MTC) device 104b that is time intolerant may not be required to read the necessary system information block (SIB) 346 data including the overload control information 356a before the machine type communication (MTC) device 104b can access the cell. In one configuration, the necessary system information block (SIB) 346 data may include SIB2, which carries Access Class Barring (ACB) information 460.

A machine type communication (MTC) device 104b that is time intolerant may use the Access Class Barring (ABC) information 460 provided in SIB2 while a machine type communication (MTC) device 104a that is time tolerant may use the Access Class Barring (ACB) information 460 provided in a special system information block SIBx, which has longer periodicity. SIBx may carry the parameters for machine type communication (MTC) devices 104. User equipments (UEs) 354 other than machine type communication (MTC) devices 104 may not be required to monitor SIBx.

SIB2 has a short periodicity that is beneficial to reducing latency. However, SIB2 is an expensive resource and adding additional data to SIB2 may be difficult. Thus, it is foreseeable that Initial Back Off (IBO) information 466 may be carried in a system information block (SIB) 346 other than SIB2. The special system information block SIBx has long periodicity and is a low cost resource. Thus, SIBx may carry Initial Back Off (IBO) information 466, Access Class Barring (ACB) information 460, random access channel (RACH) barring information 468 and specific random access channel (RACH) resources information 470 for machine type communication (MTC) devices 104 to facilitate the requirements of a time tolerant machine type communication (MTC) device 104a.

The base station 102 may broadcast 708 the system information (SI) message 340 before the next modification period boundary. In this way, the base station 102 may mitigate congestion by changing the overload control information 356a used by the user equipments (UEs) 354 that have the specific access class 114.

Figure 8:
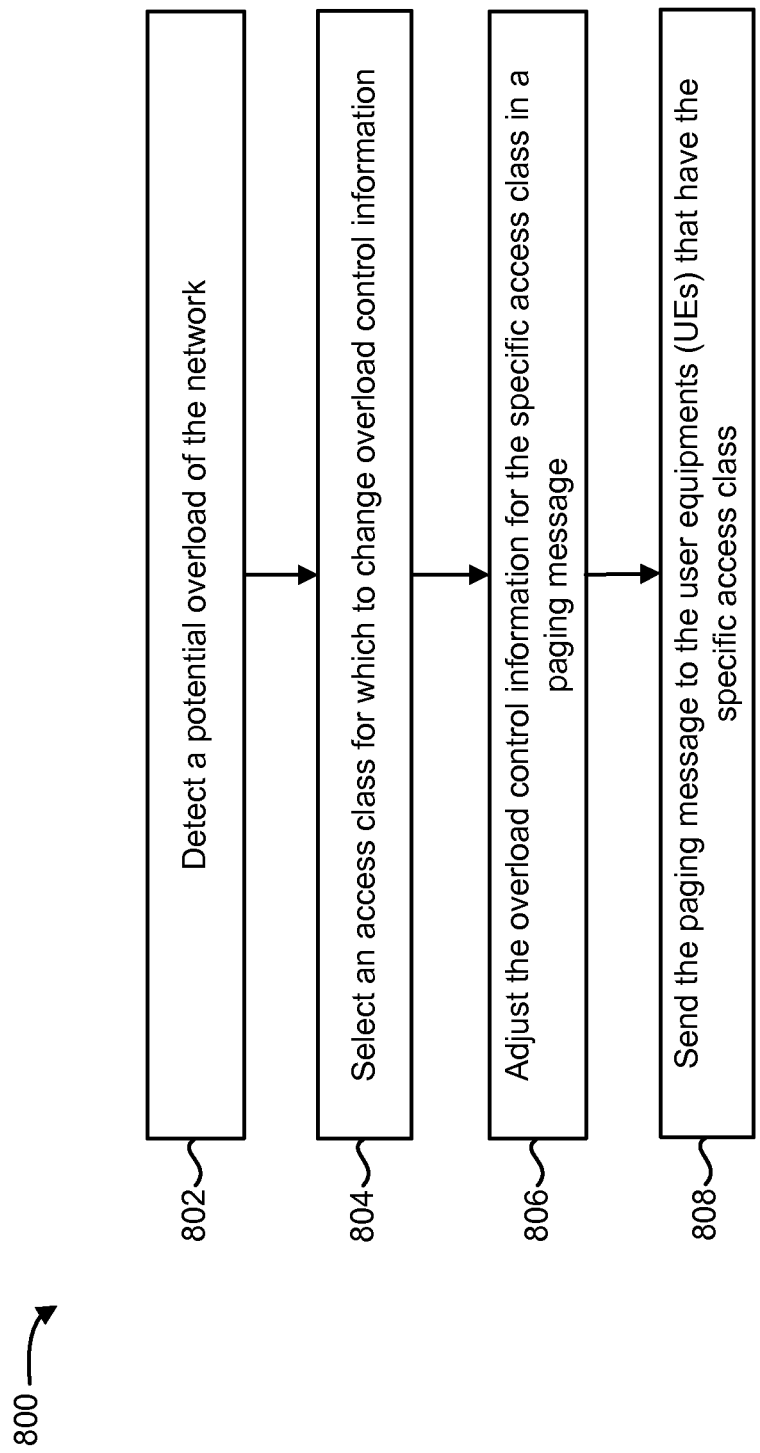
FIG. 8 is a flow diagram of a method for reducing congestion by sending overload control information in a paging message.

FIG. 8 is a flow diagram of a method 800 for reducing congestion by sending overload control information 356b in a paging message 348. The method 800 may be performed by a base station 102. The base station 102 may detect 802 a potential overload of the network. The base station 102 may then select 804 an access class 114 for which to change overload control information 356b.

Once the access class 114 has been selected, the base station 102 may adjust 806 the overload control information 356b for the specific access class 114 in a paging message 348. The paging message 348 may indicate that the overload control information 356b is for those user equipments (UEs) 354 that have the specific access class 114. User equipments (UEs) 354 of the same paging group, which is divided my monitoring occasion, will read the paging message 348. Each user equipment (UE) 354 will only read the information in the paging message 348 related to the user equipment (UE) 354. The base station 102 may then send 808 the paging message 348 to the user equipments (UEs) 354 that have the specific access class 114. The user equipments (UEs) 354 that have the specific access class 114 may use the overload control information 356b in access procedures, thereby reducing the congestion of the base station 102.

Figure 9:
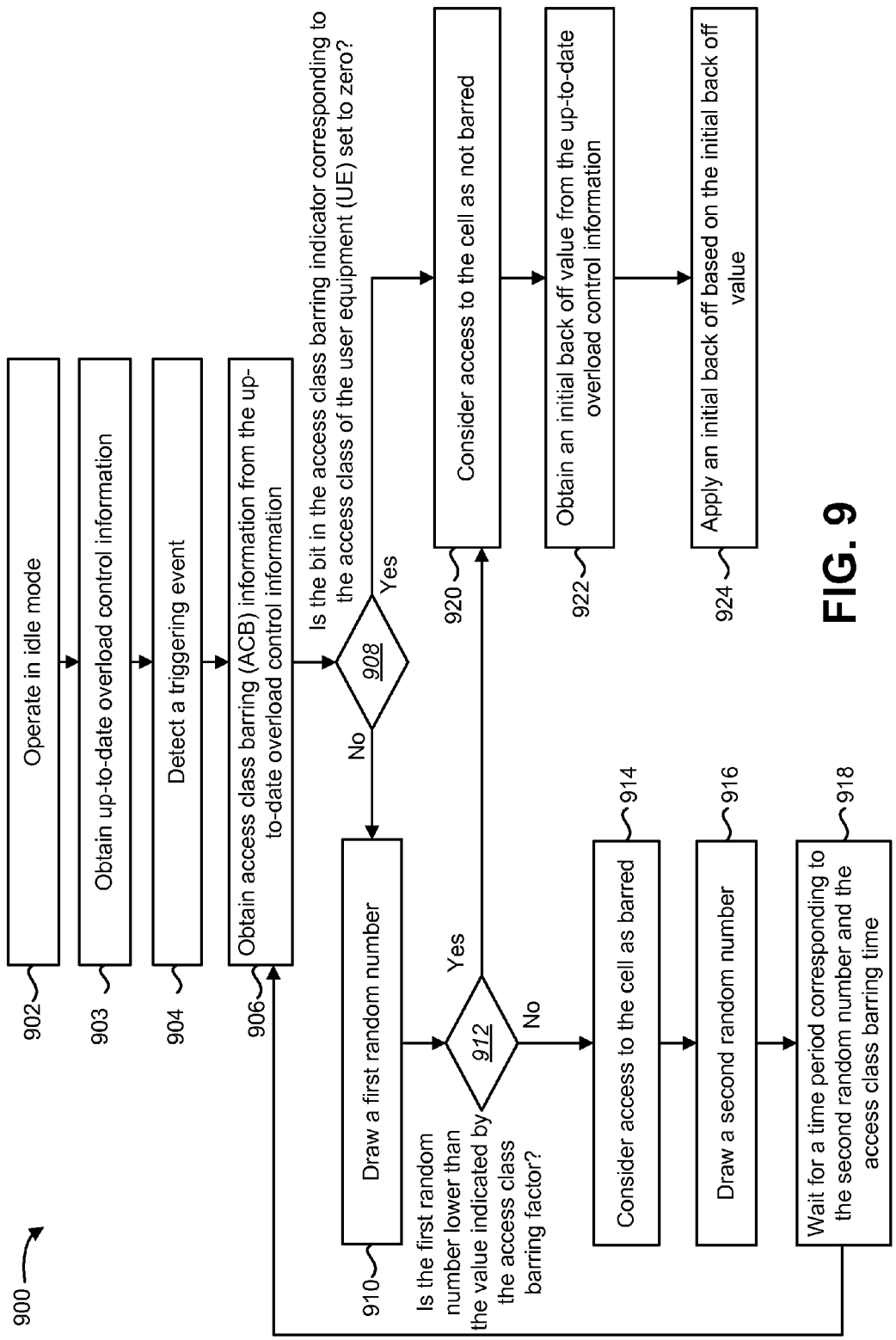
FIG. 9 is a flow diagram of another method for reducing congestion.

FIG. 9 is a flow diagram of another method 900 for reducing congestion. The method 900 may be performed by a user equipment (UE) 354. The user equipment (UE) 354 may be a machine type communication (MTC) device 104 or a wireless communication device 118. The user equipment (UE) 354 may operate 902 in idle mode. The user equipment (UE) 354 may obtain 903 up-to-date overload control information 356.

The user equipment (UE) 354 may acquire and store system information (SI) based on normal procedures and/or additional procedures for the up-to-date overload control information 356 as discussed above in relation to FIG. 3. This system information (SI) acquisition is performed any time if required. The user equipment (UE) 354 may receive and store the updated overload control information 356 via a paging message 348, a system information (SI) message 340 or a system information (SI) message 340 accompanied by an overload control information change notification 358 in a paging message 348. The user equipment (UE) 354 may only receive and store updated overload control information 356 if the user equipment (UE) 354 is part of the specific access class 114 during the radio resource control (RRC) connection establishment procedure. If the user equipment (UE) 354 is not part of the specific access class 114, the user equipment (UE) 354 may have already received and stored the pertinent overload control information 356 from the base station 102. In one configuration, the updated overload control information 356 may be stored during a modification period.

The user equipment (UE) 354 may detect 904 a triggering event that requires the user equipment (UE) 354 to access the network. Examples of triggering events include a change in pressure on an oil valve, a sudden drop in temperature, a change in heart rhythms for a pacemaker, etc. Triggering events may be different for each type of machine type communication (MTC) device 104. By triggering events, the user equipment (UE) 354 starts the radio resource control (RRC) connection establishment procedure. The user equipment (UE) 354 may then obtain 906 Access Class Barring (ACB) information 460 from the up-to-date overload control information 356.

The user equipment (UE) 354 may determine 908 whether, for the access class of the user equipment (UE) 354, the corresponding bit in the access class barring indicator 361 ac-BarringForSpecialAC is set to zero. The access class barring indictor 361 ac-BarringForSpecialAC is a bit strings as a bitmap for each access class. If the corresponding bit in the access class barring indicator 361 ac-BarringForSpecialAC is set to zero, the user equipment (UE) 354 considers 920 access to the cell as not barred.

If the corresponding bit in the access class barring indicator 361 ac-BarringForSpecialAC is set to one, the user equipment (UE) 354 may draw 910 a first random number "randOne" uniformly distributed in the range 0<=randOne<1. If the random number "randOne" drawn is lower than the value indicated by the access class barring factor 462, the user equipment (UE) 354 considers 920 access to the cell as not barred. If the random number "randOne" drawn is not lower than the value indicated by the access class barring factor 462, the user equipment (UE) 354 considers 914 access to the cell as barred.

If access to the cell is considered 914 as barred, the user equipment (UE) 354 may draw 916 a second random number "randTwo." The second random number "randTwo" may correspond to the access class barring time 464. The user equipment (UE) 354 may wait 918 for a time period corresponding to the second random number "randTwo" and the access class barring time 464. For example, the time period may equal (0.7+0.6*randTwo)*ac-Barring time. Once the time period has expired, the user equipment (UE) 354 may return to obtaining 906 updated access class barring (ACB) information from the stored overload control information 356.

If the user equipment (UE) 354 has considered 920 access to the cell as not barred, the user equipment (UE) 354 may obtain 922 an initial back off value 467 from the up-to-date overload control information 356. The user equipment (UE) 354 may then apply 924 an initial back off based on the initial back off value 467.

There are several different ways to apply 924 the initial back off based on the initial back off value 467. In a first method, the initial back off value 467 is applied to the radio resource control (RRC) layer 238. The radio resource control (RRC) layer 238 in the user equipment (UE) 254 may decide the time to wait before initiating transmission of the RRCConnectionRequest message. Therefore, the initial back off value 467 is used for the initiation of providing the RRCConnectionRequest message to the lower layer. If the radio resource control (RRC) message is provided to the lower layer after the back off time, a random access procedure may be initiated by the media access control (MAC) layer 232. The initial back off is thus applied 924 before a radio resource control (RRC) connection establishment and is not used for a user equipment (UE) 354 in RRC_CONNECTED. Because this method is performed in the higher layer, the larger value of initial back off can be applied.

In a second method, the initial back off value may be applied in the media access control (MAC) layer 232. The media access control (MAC) layer 232 in the user equipment (UE) 254 may decide the time to wait to initiate the random access procedure. The random access procedure is used for a scheduling request initiated by the media access control (MAC) itself. The random access procedure may be caused by a radio resource control (RRC) connection establishment by the user equipment (UE) 354 in RRC_IDLE or by the uplink data arrival in RRC_CONNECTED.

Specific user equipments (UEs) 354 (i.e., those user equipments (UEs) 354 that have the specific access class 114) may be required to take a back off time to initiate the random access process and reattempt the random access process while normal user equipments (UEs) 354 are only required to take a back off time to reattempt the random access process. The initial back off value 467 may be used for the initiation of random access procedures and can be used for a user equipment (UE) 354 regardless of the mode (i.e., it can be used in either RRC_IDLE mode or RRC_CONNECTED mode).

A back off time to reattempt the random access process may differentiate between normal user equipments (UEs) 354 and specific user equipments (UEs) 354. It can achieve the distribution of a back off time to reattempt the random access process as well as to initiate the random access process. A back off value for specific user equipments (UEs) 354 to reattempt the random access process may be the same value as the initial back off value 467 or may be signaled by the base station 102.

Specific physical random access channel (PRACH) resources may be pertained to specific user equipments (UEs) 354 in the higher layer (i.e., the radio resource control (RRC) layer 238). The media access control (MAC) layer 232 may control the initial back off based on specific physical random access channel (PRACH) resources rather than based on specific user equipments (UEs) 354. If the user equipment (UE) 354 uses specific physical random access channel (PRACH) resources, the user equipment (UE) 354 may take a back off time to initiate the random access procedure and reattempt the random access process.

Figure 10:
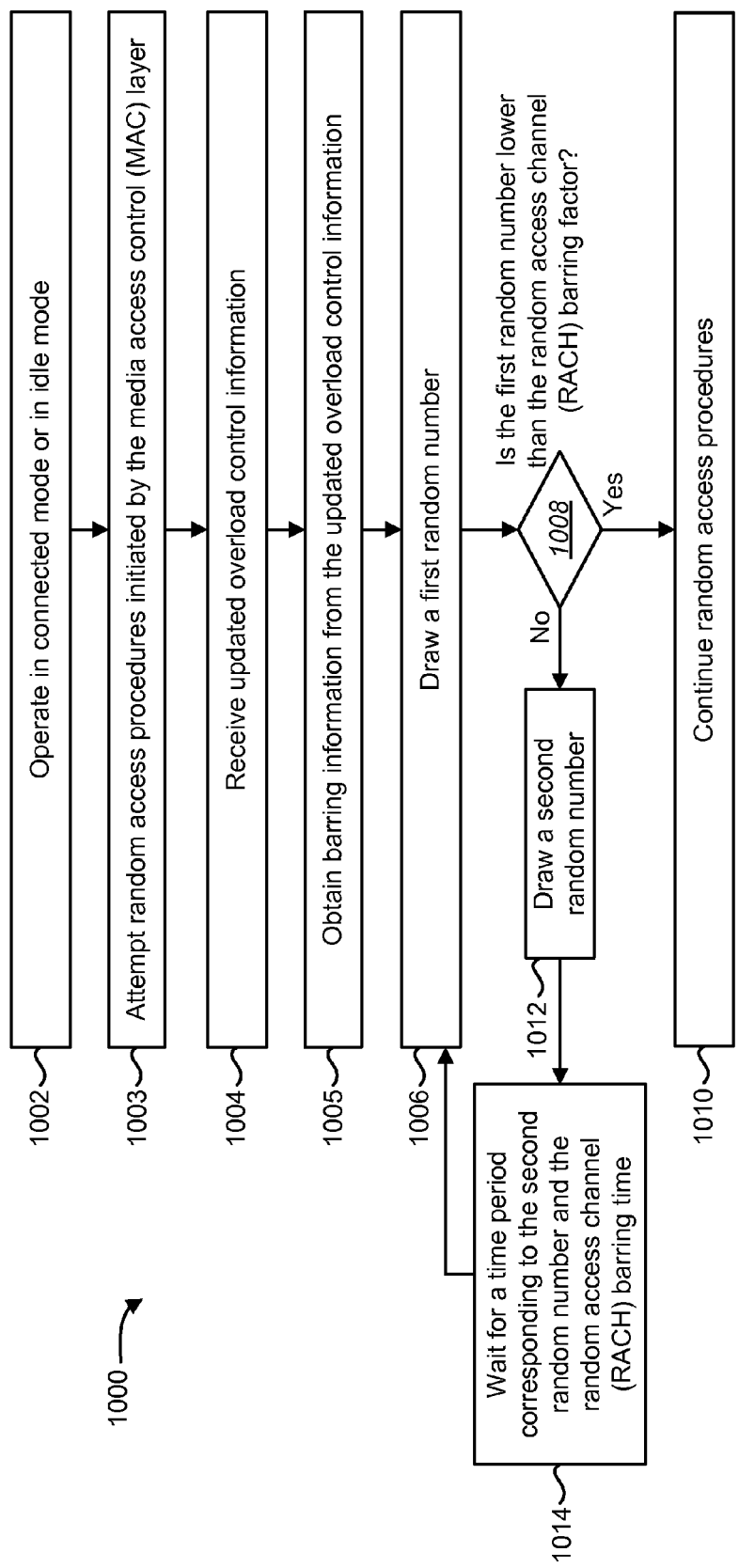
FIG. 10 is a flow diagram of a method for applying random access channel (RACH) barring.

FIG. 10 is a flow diagram of a method 1000 for applying random access channel (RACH) barring. The method 1000 may be performed by a user equipment (UE) 354. The user equipment (UE) 354 may operate 1002 in connected mode (i.e., RRC_CONNECTED) or in idle mode (i.e., RRC_IDLE). The user equipment (UE) 354 may attempt 1004 random access procedures initiated by the media access control (MAC) layer 232.

The user equipment (UE) 354 may then draw 1006 a first random number. The user equipment (UE) 354 may determine 1008 whether the first random number is lower than the random access channel (RACH) barring factor 469. As discussed above in relation to FIG. 4, the user equipment (UE) 354 may receive the random access channel (RACH) barring factor 469 from the base station 102. If the first random number is lower than the random access channel (RACH) barring factor 469, the user equipment (UE) 354 may assume that the random access procedure is not barred and may continue 1010 random access procedures.

If the first random number is not lower than the random access channel (RACH) barring factor 469, the user equipment (UE) 354 may assume that the random access procedure is barred. The user equipment (UE) 354 may draw 1012 a second random number. The user equipment (UE) 354 may then wait 1014 for a time corresponding to the second random number and the random access channel (RACH) barring time 471. As discussed above in relation to FIG. 4, the user equipment (UE) 354 may receive the random access channel (RACH) barring time 471 from the base station 102. Once the user equipment (UE) 354 has waited for the time, the user equipment (UE) 354 may again draw 1006 a first random number.

If the Access Class Barring (ACB) mechanism is implemented as random access channel (RACH) barring, the initial back off (IBO) mechanism may also be implemented in the media access control (MAC) layer 232. The user equipment (UE) 354 may assume that the random access procedure is not barred and may apply the initial back off and continue 1010 random access procedures.

The schemes as mentioned above can be applied to specific user equipments (UEs) 354 (i.e., those user equipments (UEs) 354 that have the specific access class 114). For example, the use of the Access Class Barring Mechanism (ACB) and/or the Initial Back Off (IBO) mechanism and/or the random access channel (RACH) barring mechanism and/or enforcement of system information block (SIB) reading and/or paging notification may be predefined, decided based on the access class or signaled bi the base station 120 or the network via the broadcast channel, the dedicated channel or the paging channel.

Figure 11:
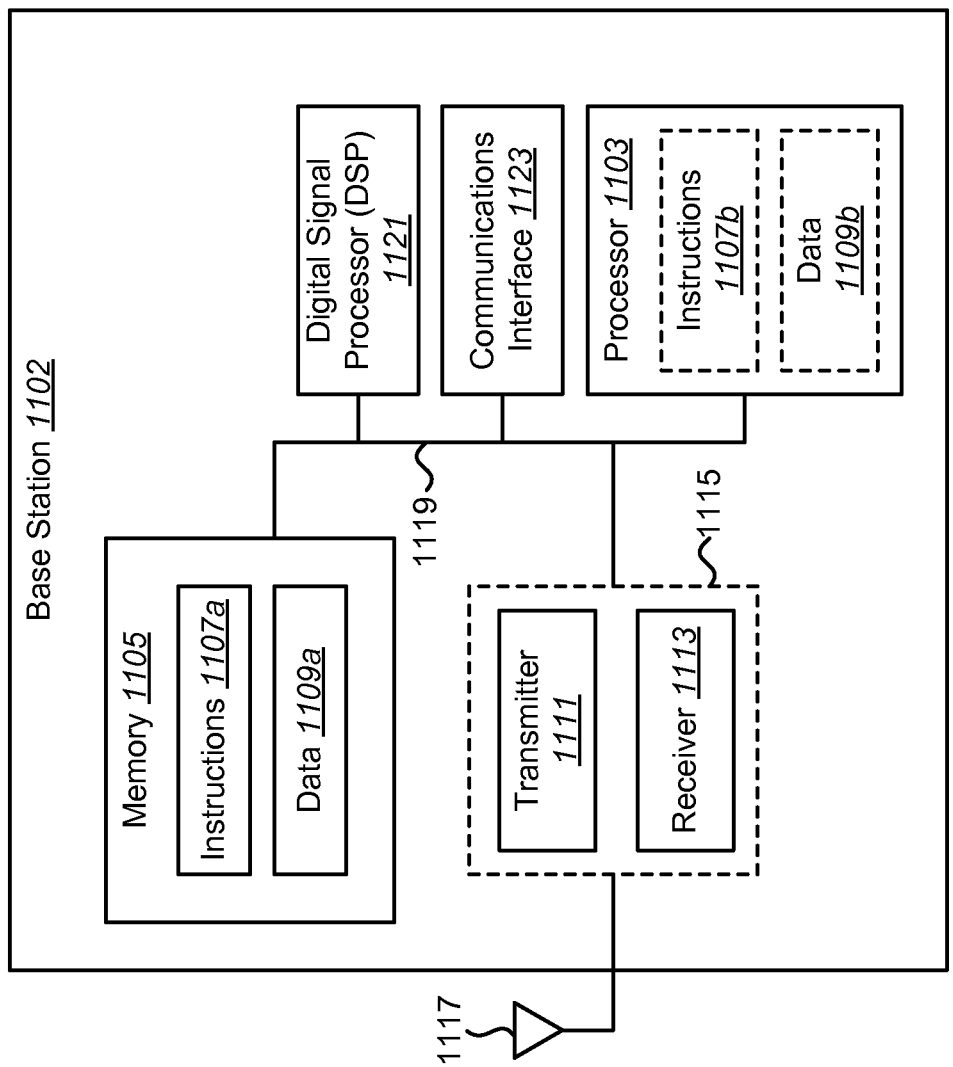
FIG. 11 illustrates various components that may be utilized in a base station.

FIG. 11 illustrates various components that may be utilized in a base station 1102. The base station 1102 may be an access point, a Node B, an eNodeB, etc. The base station 1102 includes a processor 1103 that controls operation of the base station 1102. The processor 1103 may also be referred to as a CPU. Memory 1105, which may include both read-only memory (ROM), random access memory (RAM) or any type of device that may store information, provides instructions 1107a and data 1109a to the processor 1103. A portion of the memory 1105 may also include non-volatile random access memory (NVRAM). Instructions 1107b and data 1109b may also reside in the processor 1103. Instructions 1107b loaded into the processor 1103 may also include instructions 1107a from memory 1105 that were loaded for execution by the processor 1103. The instructions 1107b may be executed by the processor 1103 to implement the methods disclosed herein.

The base station 1102 may also include a housing that includes a transmitter 1111 and a receiver 1113 to allow transmission and reception of data. The transmitter 1111 and receiver 1113 may be combined into a transceiver 1115. An antenna 1117 is attached to the housing and electrically coupled to the transceiver 1115. Additional antennas may also be used.

The various components of the base station 1102 are coupled together by a bus system 1119 which may include a power bus, a control signal bus, and a status signal bus, in addition to a data bus. However, for the sake of clarity, the various buses are illustrated in FIG. 11 as the bus system 1119. The base station 1102 may also include a digital signal processor (DSP) 1121 for use in processing signals. The base station 1102 may further include a communications interface 1123 that provides user access to the functions of the base station 1102. The base station 1102 illustrated in FIG. 11 is a functional block diagram rather than a listing of specific components.

Figure 12:
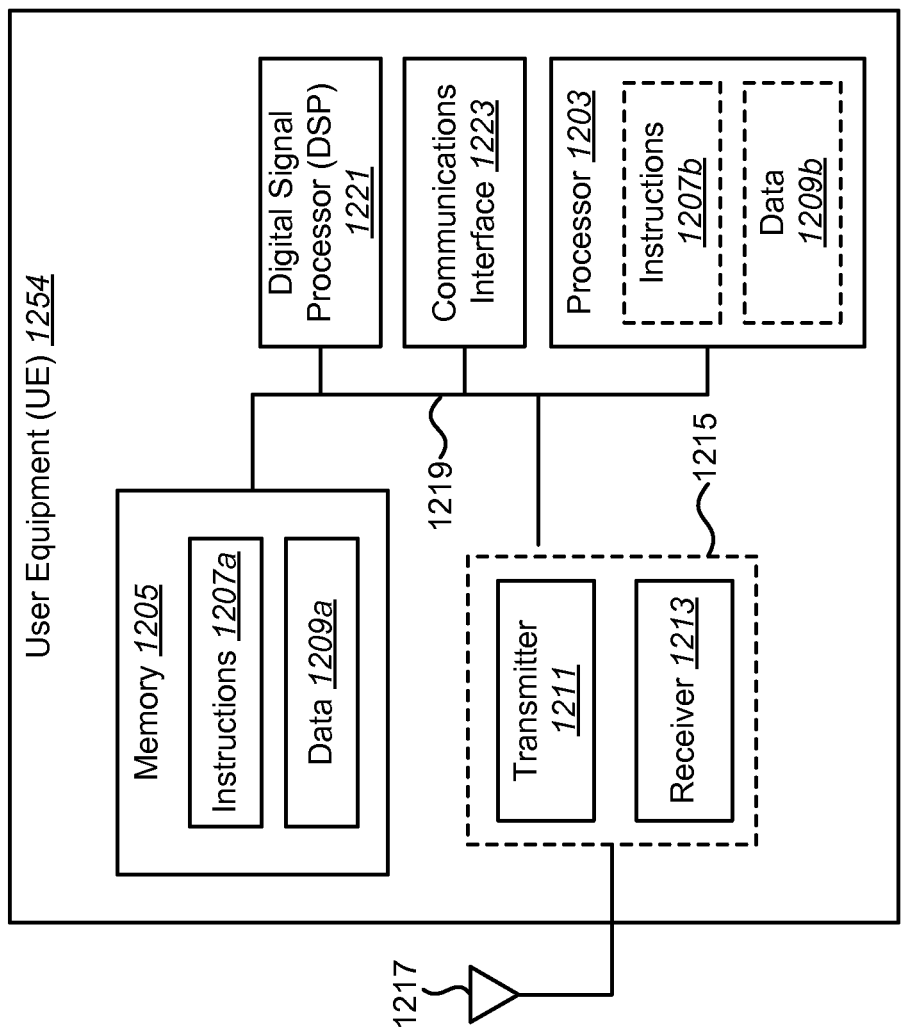
FIG. 12 illustrates various components that may be utilized in a user equipment (UE).

FIG. 12 illustrates various components that may be utilized in a user equipment (UE) 1254. The user equipment (UE) 1254 may include components that are similar to the components discussed above in relation to the base station 1102, including a processor 1203, memory 1205 that provides instructions 1207a and data 1209a to the processor 1203, instructions 1207b and data 1209b that may reside in the processor 1203, a housing that contains a transmitter 1211 and a receiver 1213 (which may be combined into a transceiver 1215), an antenna 1217 electrically coupled to the transceiver 1215, a bus system 1219, a digital signal processor (DSP) 1221 for use in processing signals, a communications interface 1223, and so forth.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory may be integral to a processor and still be said to be in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method performed by a base station apparatus, comprising:
    transmitting a paging message with a notification of changing a first access barring parameter, wherein
        the first access barring parameter is included in a specific system information block which is different from a System Information Block Type2 which includes a second access barring parameter,
        the paging message is also used as a notification of a change of system information including changing the second access barring parameter due to modification during a next modification period,
        the second access barring parameter in the System Information Block Type2 is not changed within a present modification period and is required to wait for the next modification period to change, and
        the first access barring parameter in the specific system information block is updateable during the present modification period and is not required to wait for the next modification period to change;
    adjusting the first access barring parameter in the specific system information block to bar access from specific user equipment; and
    transmitting the adjusted first access barring parameter in the specific system information block.

2. The method of claim 1, wherein the specific user equipment comprises machine type communication devices and wireless communication devices.

3. The method of claim 1, wherein the base station in an ENodeB.

4. A base station configured to control network congestion, the apparatus comprising:
    a processor;
    a memory in electronic communication with the processor; and
    instructions stored in the memory, the instructions being executable to:
        transmit a paging message with a notification of changing a first access barring parameter, wherein
            the first access barring parameter is included in a specific system information block which is different from a System Information Block Type2 which includes a second access barring parameter,
            the paging message is also used as a notification of a change of system information including changing the second access barring parameter due to modification during a next modification period,
            the second access barring parameter in the System Information Block Type2 is not changed within a present modification period and is required to wait for the next modification period to change, and
            the first access barring parameter in the specific system information block is updateable during the present modification period and is not required to wait for the next modification period to change;
        adjust the first access barring parameter in the specific system information block to bar access from specific user equipment; and
        transmit the adjusted first access barring parameter in the specific system information block.

5. The base station of claim 4, wherein the specific user equipment comprises machine type communication devices and wireless communication devices.

6. The base station of claim 4, wherein the base station in an ENodeB.

7. A method which controls network congestion, wherein the method is performed by a user equipment, the method comprising:
    obtaining a paging message with a notification of changing a first access barring parameter, wherein
        the first access barring parameter is included in a specific system information block which is different from a System Information Block Type2 which includes a second access barring parameter,
        the paging message is also used as a notification of a change of system information including changing the second access barring parameter due to modification during a next modification period,
        the second access barring parameter in the System Information Block Type2 is not changed within a present modification period and is required to wait for the next modification period to change, and
        the first access barring parameter in the specific system information block is updateable during the present modification period and is not required to wait for the next modification period to change; and
    obtaining the first access barring parameter in the specific system information block to bar access from specific user equipment of the specific system information block.

8. The method of claim 7, wherein the user equipment is a machine type communication device.

9. The method of claim 7, wherein the user equipment is a wireless communication device.

10. The method of claim 7, wherein the user equipment includes an access class.

11. An apparatus configured to control network congestion, the apparatus comprising:
a processor;
a memory in electronic communication with the processor; and
instructions stored in the memory, the instructions being executable to:
obtain a paging message with a notification of changing a first access barring parameter, wherein
the first access barring parameter is included in a specific system information block which is different from a System Information Block Type2 which includes a second access barring parameter,
the paging message is also used as a notification of a change of system information including changing the second access barring parameter due to modification during a next modification period,
the second access barring parameter in the System Information Block Type2 is not changed within a present modification period and is required to wait for the next modification period to change, and
the first access barring parameter in the specific system information block is updateable during the present modification period and is not required to wait for the next modification period to change; and
obtain the first access barring parameter in a specific system information block to bar access from specific user equipment of the specific system information block.

12. The apparatus of claim 11, wherein the user equipment is a machine type communication device.

13. The apparatus of claim 11, wherein the user equipment is a wireless communication device.

14. The apparatus of claim 11, wherein the user equipment includes an access class.

* * * * *